(12) United States Patent
Marchand et al.

(10) Patent No.: US 6,362,445 B1
(45) Date of Patent: Mar. 26, 2002

(54) MODULAR, MINIATURIZED SWITCHGEAR

(75) Inventors: Francois J. Marchand, Pittsburgh, PA (US); George Alfred Hodkin; Trevor Brian Marshal, both of Nottingham (GB); Norman Davies, Irwin, PA (US); Peter J. Theisen, West Bend, WI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/476,243

(22) Filed: Jan. 3, 2000

(51) Int. Cl.⁷ .............................................. H01H 33/02
(52) U.S. Cl. ...................................... 218/155; 317/103
(58) Field of Search ........................ 218/118–140, 138, 218/123, 153; 361/600–624

(56) References Cited

U.S. PATENT DOCUMENTS

| | | | | |
|---|---|---|---|---|
| 4,184,058 A | * | 4/1969 | Irik et al. ................. | 200/153 P |
| 3,599,041 A | * | 8/1971 | Boersm ..................... | 317/18 R |
| 3,665,257 A | * | 5/1972 | De Heus .................... | 317/103 |
| 3,813,506 A | * | 5/1974 | Mitchell ................. | 200/144 B |
| 3,886,336 A | * | 5/1975 | Boersma et al. .......... | 200/48 R |
| 4,568,808 A | * | 2/1986 | Thuries et al. ............ | 200/48 V |
| 4,633,047 A | * | 12/1986 | Mennell .................... | 200/50 R |
| 5,719,365 A | * | 2/1998 | Tanimizu et al. ........... | 218/118 |
| 5,808,258 A | | 9/1998 | Luzzi | |
| 6,107,592 A | * | 8/2000 | Morita et al. ................ | 218/118 |

* cited by examiner

Primary Examiner—Michael L. Gellner
Assistant Examiner—Nhung Nguyen
(74) Attorney, Agent, or Firm—Martin J. Moran

(57) ABSTRACT

A compact switchgear system employing a number of modular components that plug into their mating interface and are maintained in electrical isolation employing solid insulation in a manner that substantially shields the electrical conducting portions of the assembly from contact with lower voltage portions of the system. The assembly is primarily made up of five modules. A multi-phase load connector having integral current monitoring transformers for each of the respective phases; a voltage monitoring transformer which plugs into the load connector; an in-line actuator and vacuum interrupter module, provided for each phase, which plugs into the load connector; a three position vacuum switch connected between the vacuum interrupter module and the line or ground; and an electronic control module which receives inputs from the current and voltage monitors, circuit relays, vacuum interrupter/in-line actuator module, and temperature sensors, and provides programmed, controlling outputs to the in-line actuators of the respective vacuum interrupter modules.

41 Claims, 8 Drawing Sheets

MODULAR, MINIATURIZED SWITCHGEAR

CROSS REFERENCE TO RELATED APPLICATIONS

This patent application is related to corresponding U.S. patent applications Ser. Nos. 09/476,836, 09/476,564, and 09/476,501; all filed concurrently herewith.

BACKGROUND OF THE INVENTION

1. Field of the Invention

This invention pertains in general to switchgear and other switching equipment which use hermetically sealed interrupters employing insulation having a higher electrical resistance than air and more particularly to compact switchgear that employ modular components to reduce the overall size of the system.

2. Background Information

Circuit breakers provide protection for electrical systems from electrical fault conditions such as current overloads, short circuits, and abnormal level voltage conditions. Typically, circuit breakers include a spring powered operating mechanism which opens electrical contacts to interrupt the current through the conductors on an electrical system in response to abnormal conditions. In particular, vacuum circuit interrupter apparatus have been known which include separable main contacts disposed within an insulating housing. Generally, one of the contacts is fixed relative to both the housing and to an external electrical conductor which is interconnected with the circuit to be controlled by the circuit interrupter. The other contact is moveable. In the case of a vacuum circuit interrupter, the moveable contact assembly usually comprises a stem of circular cross-section having the contact at one end enclosed within a vacuum chamber and a driving mechanism at the other end which is external to the vacuum chamber. An operating rod assembly comprising a push rod, which is fastened to the end of the stem opposite the moveable contact, and a driving mechanism provide the motive force to move the moveable contact into or out of engagement with the fixed contact.

The operating rod assembly is operatively connected to a latchable operating mechanism which is responsive to an abnormal current condition. When an abnormal condition is reached, the latchable operating mechanism becomes unlatched which causes the operating rod to move to the open position. The motion of the operating rod, in turn, causes the contact bell crank to rotate and, as discussed above, this controls motion of the moveable contact.

Compression springs are provided in connection with the operating rod assembly in order to be able to separate the moveable contact from the fixed contact and to assure the necessary force so that the contacts will not accidentally open under inappropriate conditions. In addition, when appropriate circumstances requiring interruption of the circuit do arise, an adequate force is needed to open the contacts with sufficient speed. If the contacts do not open quickly, there is a risk of the contacts welding together and failure to interrupt the current.

Vacuum interrupters or reclosures are typically used, for instance, to reliably interrupt medium voltage ac currents, and in the case of vacuum interrupters also high voltage ac currents of several thousands of amperes or more. Reclosures include interrupters that are designed to typically operate in a range of current measured in amperes, rather than kiloamperes, and automatically reclose after a given delay, and for a given number of times, in an attempt to automatically reestablish the circuit. However, from the standpoint of this invention the principles discussed herein apply equally well to both, as well as to other load break switches, circuit breakers and switch disconnects.

Typically, in accordance with prior art practices, one vacuum interrupter is provided for each phase of a multi-phase circuit and the interrupters for the several phases are actuated simultaneously by a common latchable operating mechanism. This does not permit point-on-wave switching among the multiple phases and can give rise to voltage transient and uneven contact wear.

Medium size switchgear employing vacuum interrupters typically have a front low voltage portion just to the rear of the front panel which typically includes the breaker controls. The low voltage portion is electrically insulated, through the use of standoffs, from high voltage portions which include the vacuum interrupters. The standoffs permit sufficient spacing of the conducting components so that air within the housing can be an effective insulator to isolate the low voltage portions of the switchgear from the high voltage components. However, this spacing also contributes to the size of the units.

More recently attempts have been made to reduce the size of these units by hermetically sealing them and filling them with a gaseous insulator having a higher dielectric capacity than air, such as $SF_6$ However, this creates a number of environmental concerns.

Accordingly, an improved medium voltage switchgear design is desired that reduces the overall size and enhances the serviceability of the unit.

SUMMARY OF THE INVENTION

These and other needs are satisfied by the present invention which comprises a circuit switching system made up of a number of plug-in, integral, modular units with each module enclosed within solid electrical insulation that isolates the conducting members that interface between modules, from contact with lower voltage portions of the surroundings. In one embodiment, one of the modules comprises a vacuum switching device (hereafter referred to as the "isolator module") having a plurality of stationary contacts and a moveable contact mechanism which is connectable to any one of the stationary contacts which are all enclosed in a vacuum vessel, also known as a vacuum bottle. At least two conducting circuit elements are respectively connected to one of the stationary contacts and the moveable contact mechanism with a second stationary contact grounded. The moveable contact within the vacuum vessel of the isolator module is connectable to a contact on a separate breaker module, which can also contain a vacuum circuit interrupter. Each external electrical connection on the isolator module which is connectable to either a line source, e.g., main bus bar, or an electrical connector on the separate breaker module, terminates in an insulated electrical connector that is designed to mate with a complementary insulated electrical connector on the line source, and the breaker module. The other external electrical connections on the switching system modules that interface with either other modules in the system or the circuit interface, also, similarly employ complementary insulated electrical connectors, electrically insulating the interface from the external environment and sealing those mating electrical connectors from contact with lower voltage portions of the surroundings, while maintaining a good electrical connection; with the possible exception of a ground connection. If only a single line source is used when the isolator module is designed to accommodate more than one, the exposed electrical connector is fitted with a fully insulated, complementary connector, in the form of a complementary non-electrically conducting plug, to isolate the unused electrical connector from lower voltage portions of the surrounding switching system or environment, e.g., air. The vacuum isolator module is operable to connect the breaker module alternatively to one or more sources or ground in the event servicing is required or, with both contacts in the open state the isolator module can isolate the breaker module in a floating condition.

The breaker module forms a second modular component of this invention that includes a conventional vacuum interrupter, designed to withstand the currents experienced by the breaker function, whose terminals are connected to insulated electrical connectors that protrude through the vacuum vessel. Desirably both breaker module insulated electrical connectors protruding through the vacuum bottle are of the same design so that either can be connected to either side of the circuit. The breaker module further includes an integral, or separate, in-line actuator which is dedicated to actuating the moveable contact on the breaker module and is preferably enclosed within an insulated housing that could encompass both the vacuum vessel and the in-line actuator. In a preferred embodiment the in-line actuator employs two coils, each respectively controlling a different direction of movement of the moveable contact. The voltage on each of the in-line actuator coils can be controlled independently so that the moveable contact can be appropriately energized to move in the desired direction and braked to ease the moveable contact to a soft landing. Alternatively, a single coil can be employed with a means for reversing current through the coil. A single vacuum isolator module and breaker module, comprising a vacuum interrupter and in-line actuator, is employed for each phase of the circuit.

A load connector forms a third module of this invention. The load connector module includes separate insulated electrical output connectors for each phase of the load, which are designed to mate with complementary insulated electrical connectors on the load interface, electrically insulating the interface from the external environment and sealing those mating connectors from lower voltage portions of the surroundings, while maintaining a good electrical connection. The load connector module also includes integral current monitoring transformers for each phase, and an electrical connection to plug in a modular voltage transformer. The load connector module further includes insulated electrical input connectors, which are respectively in electrical contact with the corresponding output electrical connectors, and respectively mate with a complementary electrical connector on each of the breaker modules. The load connector module components are housed in a solid, electrically insulated housing.

A point-on wave-controller module is also provided which in one embodiment is adapted to receive inputs from the three-phase current monitoring transformers, the voltage transformer and sensors monitoring the position, speed, temperature and past history of the breaker module components and the control voltage available. The point-on-wave controller analyzes characteristics of the breaker module and the load current wave form, monitors and receives inputs from the circuit trip relays and provides directions to the in-line actuators to open or close the appropriate phases at appropriate times to minimize voltage transients and adverse impact to the circuit and circuit switching system components. The point-on-wave controller is particularly useful in minimizing arcing upon closing of the circuit by closing each phase at its current zero and reduce the probability of reignition.

Accordingly, the current carrying components of the modular units are fully insulated from lower voltage portions of the surrounding, employing separable complementary, insulated, electrical connectors. In addition, the outside layer of each modular unit's housing is covered with an electrically conductive coating which permits the modules to be in close contact without ionizing the surrounding air. The prescribed insulation and electrically conductive coating that enable the various modules to be positioned much closer together within the circuit switching system housing, thus significantly reducing the overall size of the switching system housing. The separable, detachable modules further enhance servicing while the point-on-wave controller and breaking capability of the in-line actuators extend the useful life of the integral components and those of the system.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENTS

Figure 1:
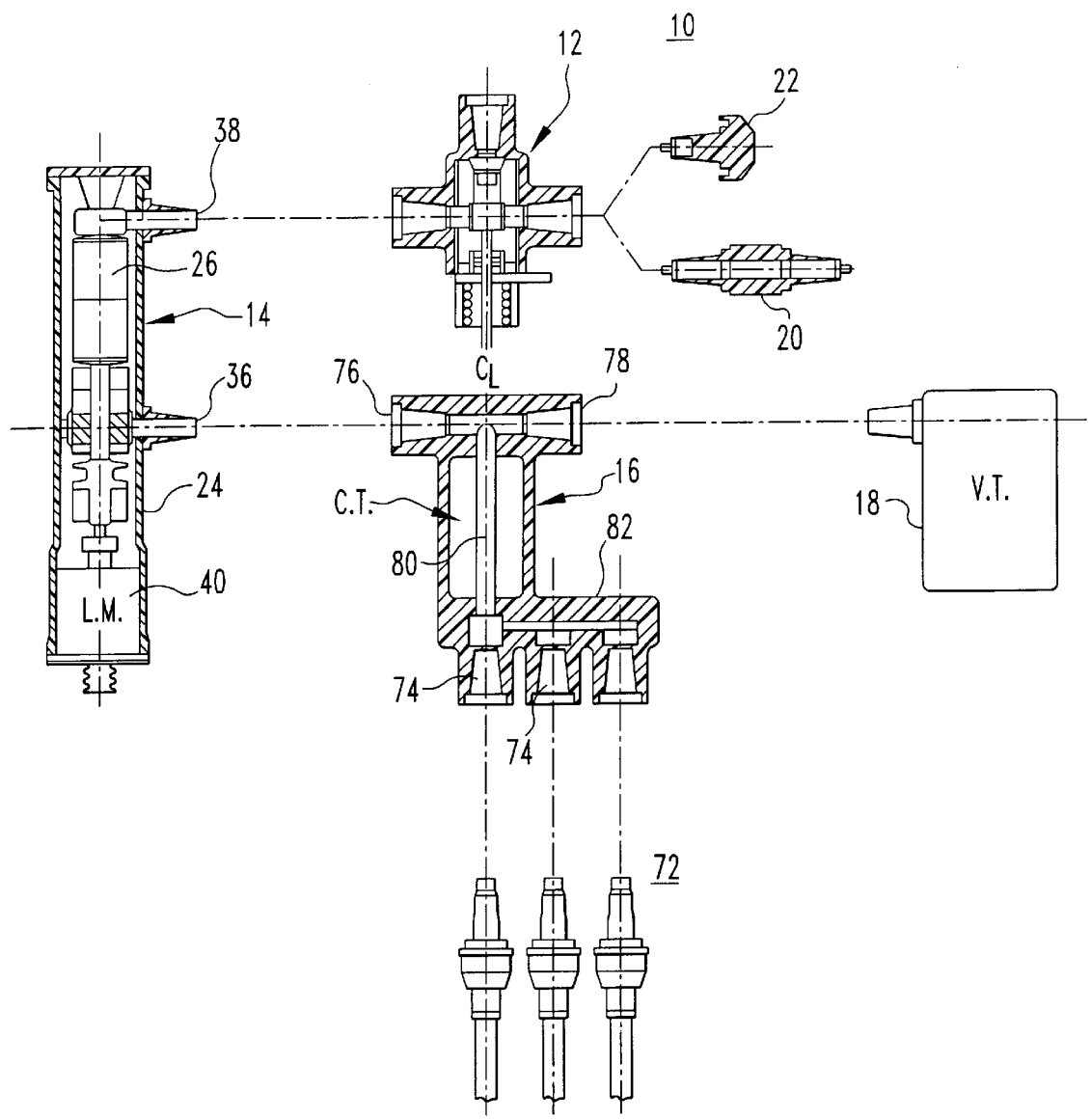
FIG. 1 is an illustration of the modular mechanical components of this invention.
Figure 2:
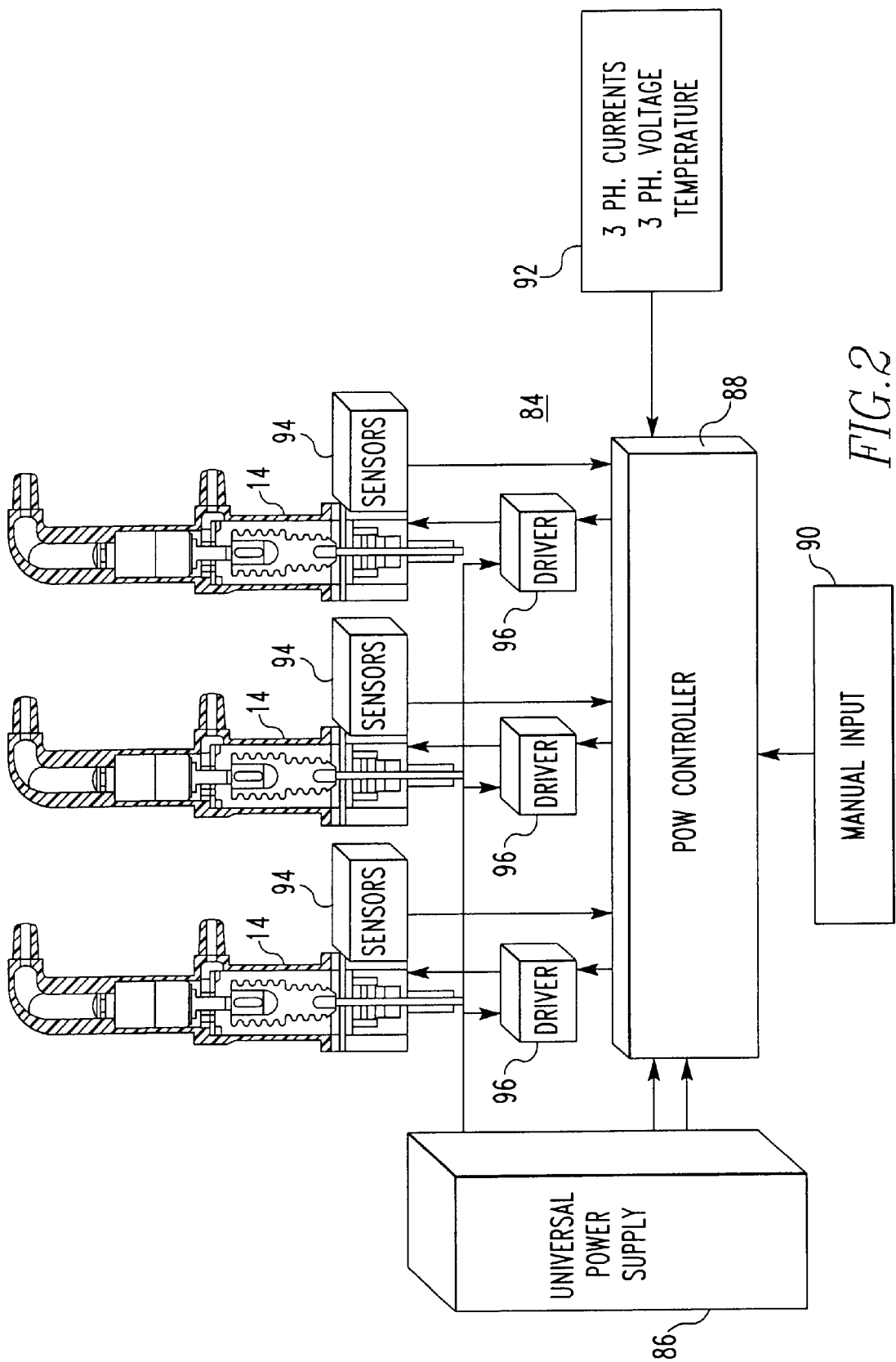
FIG. 2 is an illustration of portions of the modular system of this invention, particularly illustrating the point-on-wave controller and universal power supply interaction with the rest of the modular system.
Figure 3A:
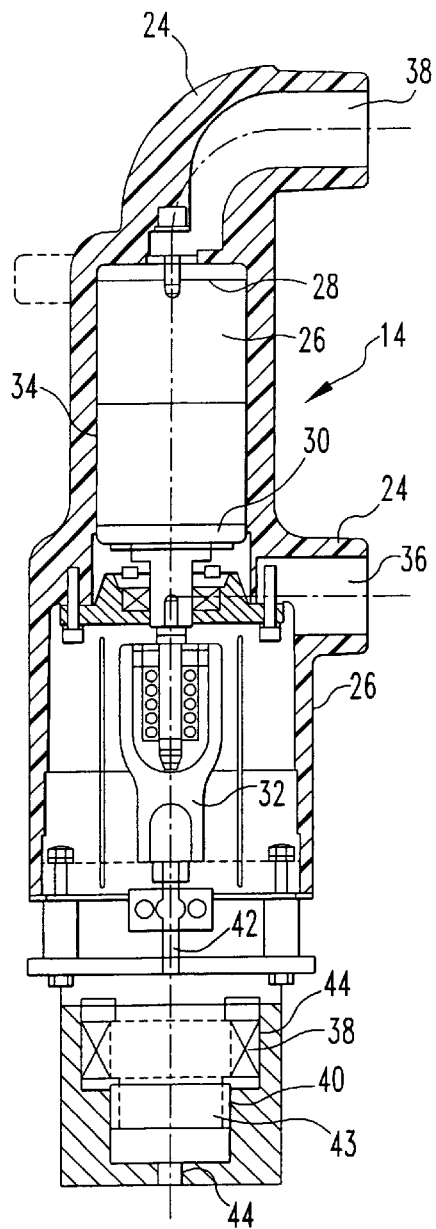
FIG. 3a is a side view, partially in section, of the breaker pole unit assembly module of this invention.
Figure 3B:
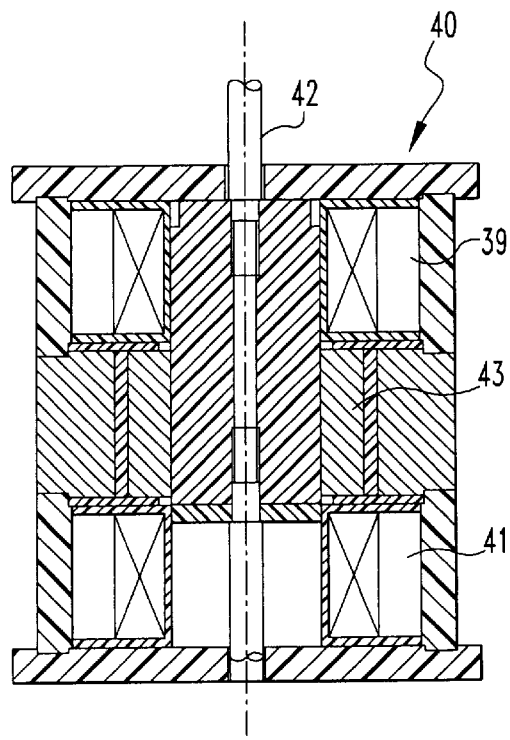
FIG. 3b is a side sectional view of an in-line actuator, incorporating two actuator coils, which can be employed by the breaker module of this invention.

FIG. 1 illustrates the modular mechanical components 10 of this invention. The breaker module 14, comprises a vacuum interrupter/linear actuator assembly. Although FIG. 3(a) shows only the vacuum interrupter portion of the assembly is sealed within a solid insulated housing 24, such as epoxy, silicon, polyurethane, etc. it should be appreciated that the entire unit can be sealed in the insulated housing, however, it is not necessary for the actuator to be so insulated since it is a relatively low voltage component. The vacuum interrupter portion 26 of the breaker module 14 is a conventional circuit breaker vacuum interrupter design and is more fully illustrated in FIG. 3. The vacuum interrupter 26 is housed within a hermetically sealed vessel 34 and includes a stationary contact 28 and moveable contact 30 which is actuated through a push rod/moveable contact stem assembly 32 slidably and sealably fitted through the vessel 34 and operable to move the moveable contact 30 into or out of engagement with the stationary contact 28. The stationary contact 28 is connected through an electrical conductor sealed within the electrically insulated housing 24 to an electrical connector 38 that is designed to mate with a corresponding complementary electrical connector on the vacuum isolator module 12 shown in FIG. 1. Similarly, the moveable contact is connected through an electrical conductor to an electrical connector 36 which is also electrically shielded by the electrically insulated housing 24 and is designed to mate with a complementary electrical connector on the load connector module 16 shown in FIG. 1. The electrical connectors 36 and 38 can either be plugs or sockets, but desirably should be of the same design so that the connections are interchangeable. The moveable contact stem/push rod assembly 32 is in turn connected to the armature on the in-line actuator 40 which drives the moveable contact into or out of engagement with the stationary contact 28 in response to an input of an appropriate drive signal which is applied at the electrical connection to the in-line actuator coil(s) 44 and is derived from the point-on-wave controller module described in more detail with regard to FIG. 2.

The in-line actuator 40 is of conventional design and consists of either one or two electrically wound coils wound around a magnetically permeable, hollow form positioned adjacent a hollow rare earth magnet 43. In the two coil design the rare earth magnet 43 is interposed between the two coils and an armature disposed in the hollow center. In the single coil design illustrated in FIG. 3(*a*) voltage of a given polarity is applied to the coil 39 to move the armature 45 in a first direction and voltage of the opposite polarity is applied to the coil 39 to move the armature 45 in the opposite direction. In the two coil design of the in-line actuator 40 shown in FIG. 3(*b*) voltage is applied to one of the coils 39 in a first direction to cause movement of the armature 45 in one direction and voltage is applied to the second coil 41 in the opposite direction to cause opposite movement of the armature 42. In the two coil design illustrated in FIG. 3(*b*) the point-on-wave controller module, described more fully hereafter with regard to FIG. 2, independently controls the voltage applied to each coil and is programmed in one embodiment to, at appropriate times and quantity, apply a voltage to both coils simultaneously to brake the moveable contact 30 to ease it into a soft landing on the stationary contact 28. Alternatively, in the single coil design the voltage polarity applied to the drive coil can be reversed just before the contact is closed to soften the landing. In that way the moveable contact is driven in either direction by the appropriate drive current being applied to the corresponding electrical coil and the movement controlled to reduce component wear. Though it is not necessary, because the voltage applied to the in-line actuator is relatively small compared to the voltage across the vacuum interrupter, it is still desirable to have the insulated housing 24 surround the whole breaker module 14 as shown in FIG. 1, to form an integral unit that enhances the integrity of the module as a whole.

Figure 4:
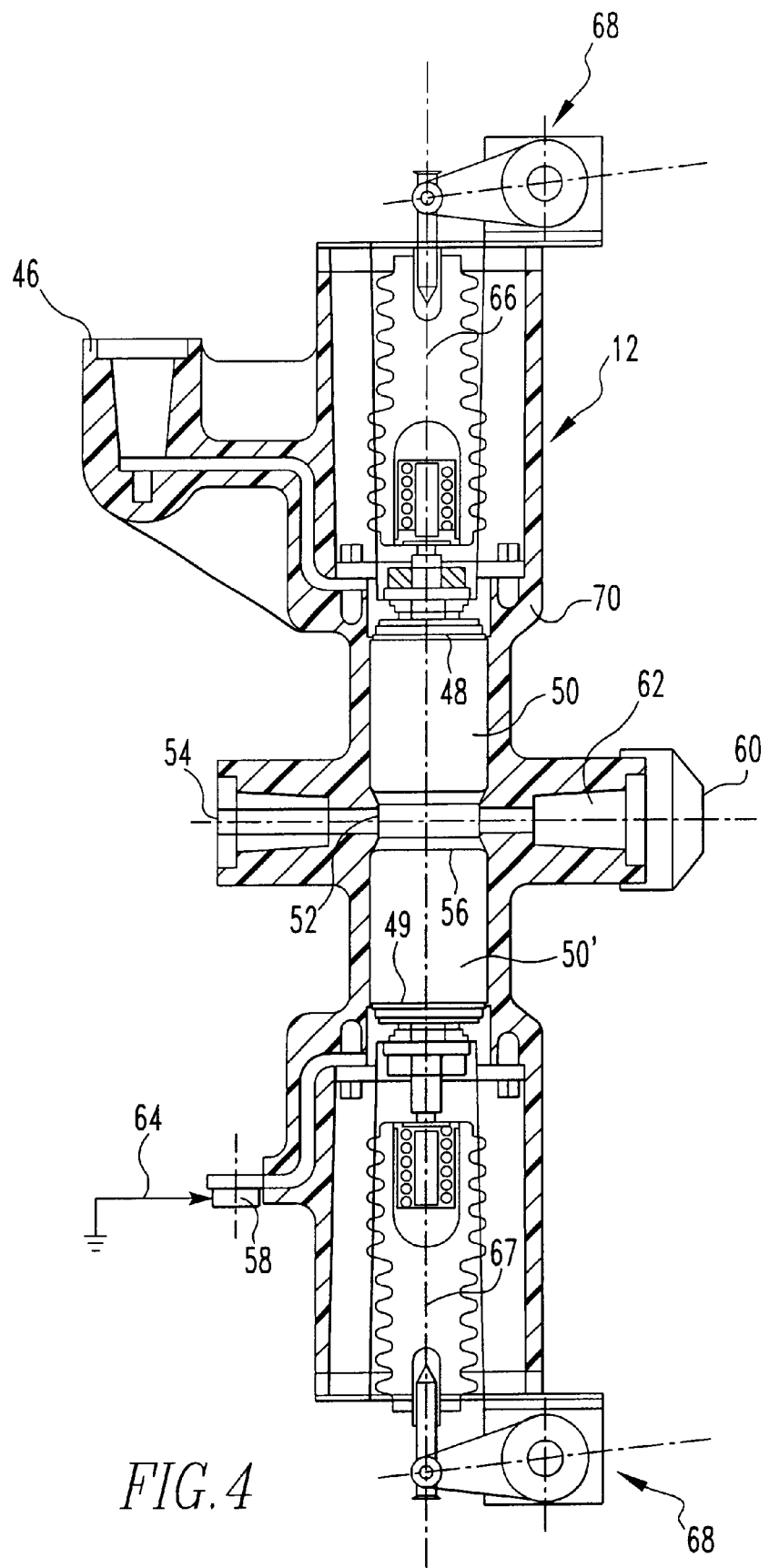
FIG. 4 is an illustration of the three-position vacuum isolator module of this invention.

The vacuum isolator module 12 shown in FIG. 1 is interposed between the bus bar 20 and one of the electrical connectors 38 or 36 of the breaker module 14; preferably the electrical connector 38 electrically communicating with the stationary contact 28. The vacuum isolator module 12 is more fully illustrated in FIG. 4 which shows a three-position isolator that is capable of connecting the breaker module 14 to either a first or second bus bar or ground. Alternatively, the vacuum isolator module of this invention can employ a two-position vacuum isolator where only one bus bar connection is envisioned and a grounded connection 64 is not desired, though a three position vacuum isolator module with a grounded connection 64 is preferred. The vacuum isolator module 12 is analogous in many respects to the vacuum interrupter of the breaker module 14, previously described with respect to FIG. 3. One of the electrical connectors of the breaker module, either 36 or 38, and more commonly 38, is connected to one of the input electrical connectors 46 on the vacuum isolator module 12. The connection is made through a complementary plug and socket design that insulates the electrical conductors within the connectors, electrically, and substantially isolates the conductors from lower voltage portions of the surroundings. The electrical connector 46 is connected by an electrical conductor to a moveable contact assembly 48 (figuratively designated by its location but not expressly shown) that is axially moveable and reciprocal within a hermetically sealed vacuum vessel 50, 50' within the isolator module 12. The vacuum vessel 50, 50' also houses two stationary contacts 52 and 56 (figuratively designated by their location) which are respectively connected through individual conductors to electrical connectors 54 and 58 which mate with complementary electrical connectors respectively associated with a ground connection 64 and a bus bar; though it will be appreciated by those skilled in the art, that it is not necessary to so insulate the ground connection. Electrical connectors 54 and 62 are connected to the same stationary contact. If only a single bus bar is employed, an electrically, insulated sealable plug 60 can be used to electrically insulate one of the electrical connectors, such as 62, and substantially isolate that conductor from contact with lower voltage portions of the surrounding. The three position vacuum isolator module 12 illustrated in FIG. 4 is constructed from two back-to-back vacuum interrupter vessels 50 and 50', respectively housing moveable contact 48 and stationary contact 52 and moveable contact 49 and stationary contact 56. In this arrangement the moveable contacts 48 and 49 are connected to the same electrical connector 46. The toggle 68 moves the moveable contact push rod 66 in opposite directions relative to the stationary contact 52, providing the moveable contact 48 with two stable positions, either into or out of engagement with the stationary contact 52. Similarly and independent of the position of the moveable contact 48, the toggle 68 is arranged to move the moveable contact push rod 67 in opposite directions relative to the stationary contact 56, providing the moveable contact 49 with two stable positions, either into or out of engagement with the stationary contact 56. When moveable contact 49 is fully closed and moveable contact 48 is in the open circuit position, the system is grounded. When moveable contact 48 is fully closed and moveable contact 49 is in the open circuit position, the breaker module 14 is connected to the power source through electrical connector 54. When the toggle 68 causes both moveable contacts 48 and 49 to be in the open position, out of contact with their corresponding stationary contacts 52 and 56, respectively, the breaker module 14 is floating. The toggle 68 is designed with an interlock that prevents both moveable contacts, 48 and 49, from being closed at the same time. A similar result can be achieved using an in-line actuator as the drive mechanism for the moveable contacts. Alternatively, the three position isolator module can be designed as described in application Ser. No. 09/476,836, filed concurrently herewith.

Figure 5A:
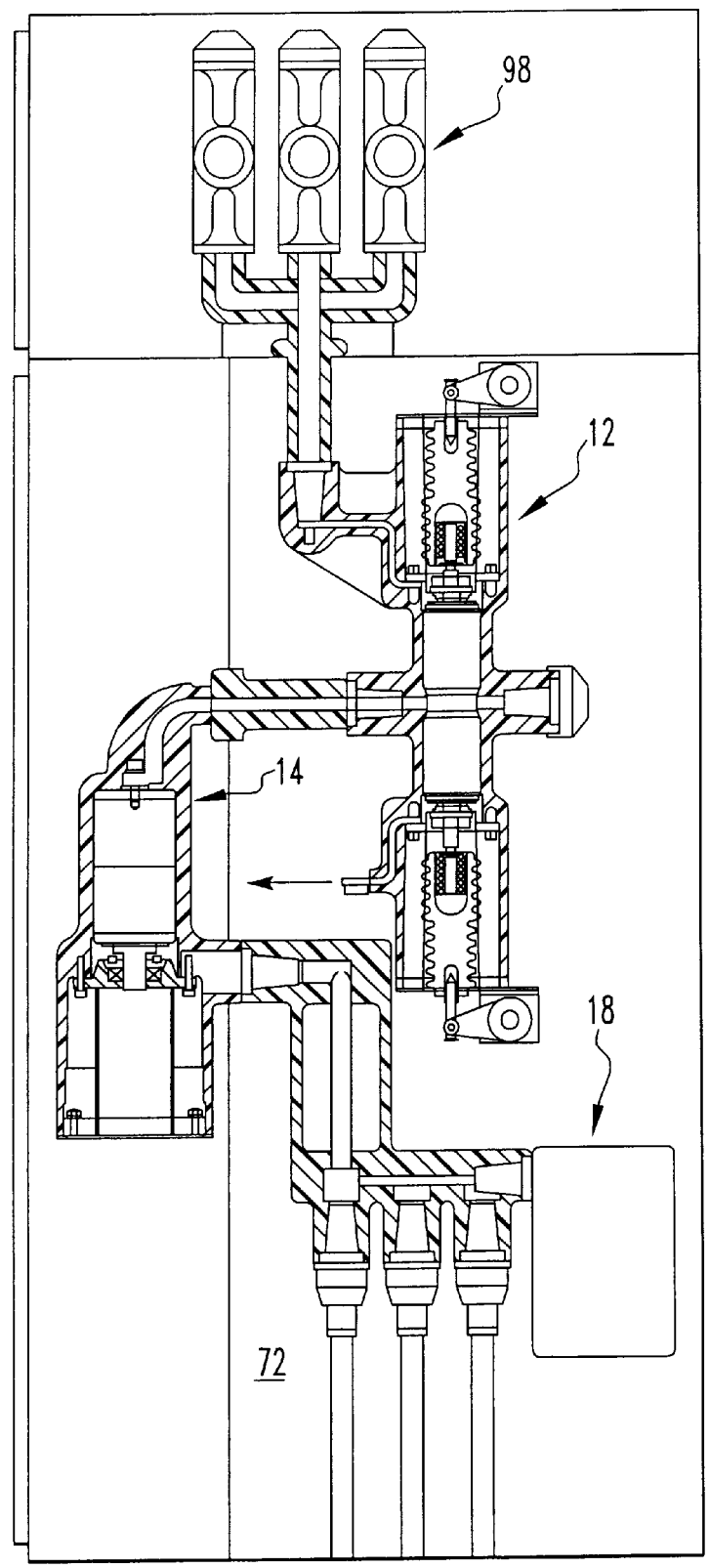
FIG. 5a is an illustration showing the mechanical modular components of this invention connected to a single three-phase bus bar arrangement.
Figure 5B:
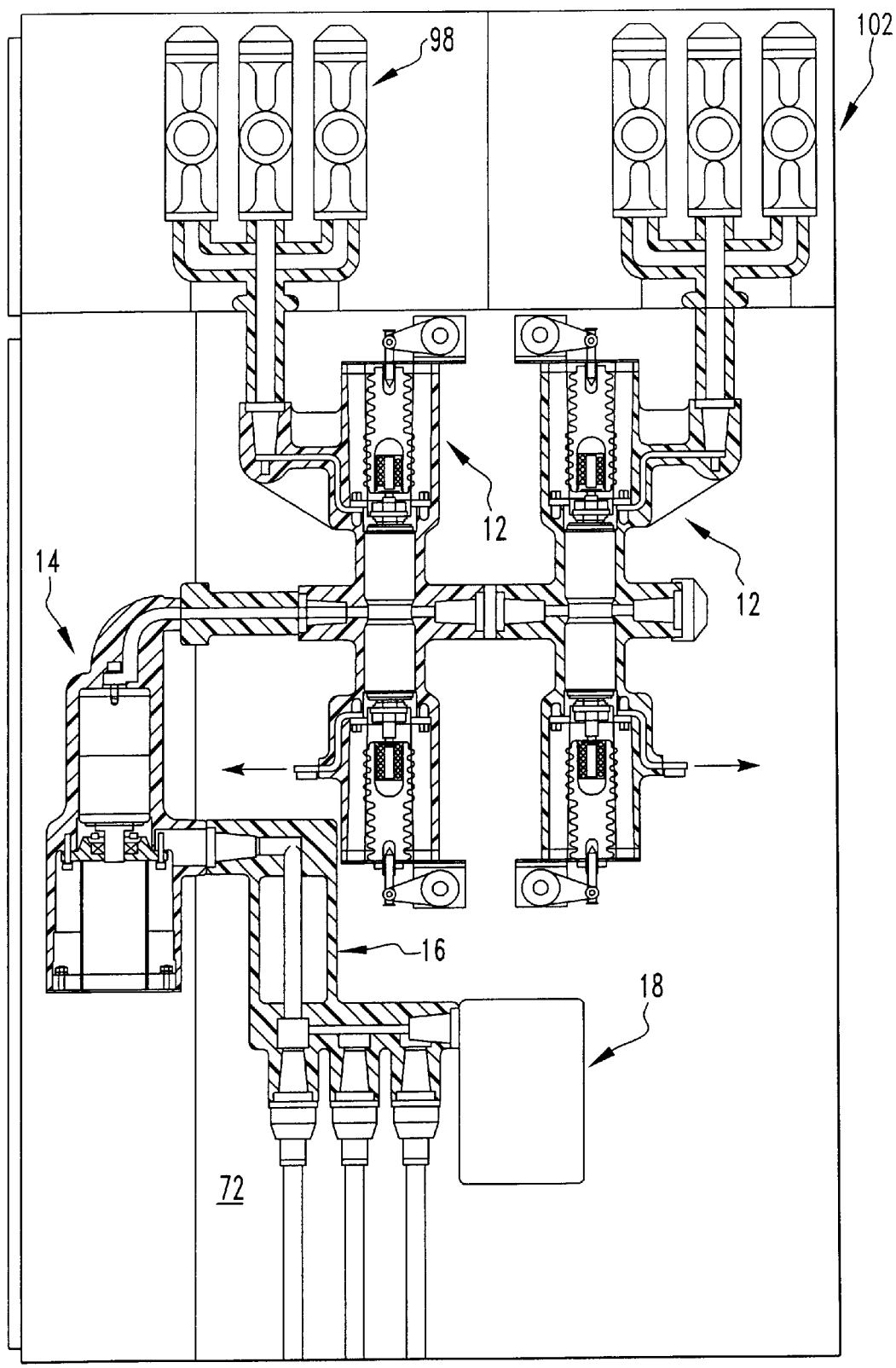
FIG. 5b is an illustration of the mechanical modular components of this invention connected to two separate bus bar three-phase supplies, which can be alternately connected to the system.

Several vacuum isolator modules 12 can be cascaded as illustrated in FIG. 5b to connect more than one line source to the load to either increase the power input or provide an alternative power backup. Thus, the moveable contacts within the vacuum isolator module 12, connected to the breaker module 14 through electrical connector 46 can connect the breaker module 14 to either of one or the other of two main bus bars or to ground, or provide a floating disconnect with both moveable contacts 48 and 49 in the open position. In the illustrated embodiment shown in FIG. 4, the moveable contacts 48 and 49 are moved under the influence of the toggle 68 and push rods 66 and 67 through the three discrete moveable contact positions, either moveable contact closed relative to its corresponding stationary contact or both moveable contacts open, which positions are controlled by the over-center-toggle mechanism 68 under the influence of a rotary action switch (not shown) on the front of the isolator module 12. The electrically conducting portions of the isolator module 12 that interface with other system modules are enclosed within a solid insulated housing 70.

Referring back to FIG. 1, it will be appreciated that a third integral module 16 is provided to connect one of the terminals, commonly 36, of the breaker module 14 to one conductor cable of a multi-conductor cable load circuit 72. The load circuit connector module 16 includes a corresponding electrical connector 74 which respectively electrically insulates and substantially isolates the load conductor from contact with lower voltage portions of the surrounding. One electrical connector 74 is provided for each conductor cable. The multi-conductor cable might respectively carry different phases of current from a multiple phase current circuit or split the current in a given phase. Thus, the multi-conductor cable load circuit 72 can comprise more than the three conductor cables illustrated in FIG. 1, which is meant to be illustrative. Each electrical connector 74 is coupled through an internal electrical conductor to an output electrical connector 76 which is designed to mate with one of the electrical connectors 36 or 38 on the breaker module 14; more commonly connector 36. Each phase is also provided with an integral current transformer 80 which provides monitoring outputs which are not shown in FIG. 1. The load circuit connector module 16 also includes a plug-in connection 78, for a voltage transformer 18, which is internally configured within the load circuit connector module 16 to connect between one of the line phases and ground. The entire load circuit connector module 16 is enclosed within solid electrical insulation 82, such as epoxy, silicon, polyurethane, etc.

Thus, FIG. 1 illustrates the high current, plug-together mechanical modules of the circuit switching system 10 of this invention. It should be recognized that one breaker module 14 is required for each phase and at least one vacuum isolator module 12 is similarly required for each phase of the load. The monitoring and control functions, within the point-on-wave control module 88, which receive inputs from the current transformers which form part of the load circuit connector module 16, the voltage transformer which forms the module 18, and other sensors in the circuit switching system, and provide the drive signals for the in-line actuator 40 in the breaker module 14, are more fully illustrated in FIG. 2.

The point-on-wave control module 84 of this invention, which include a programmable controller 88 and driver circuits 96, operate at a much lower voltage than the line and load voltages protected by the breaker module illustrated by reference character 14 in FIG. 2. The voltage for driving the electronics and control circuits within the point-on-wave control module 84 is provided by a universal power supply 86 for the various monitoring, control and actuating functions of this invention. The power supply 86 provides inputs to the point-on-wave controller 88 and drivers 96 which provide the appropriate actuation signals to the in-line actuators 40 in the breaker module 14. The point-on-wave controller 88 receives inputs 92 from the three-phase current transformers on the input module 16; the voltage output from module 18; outputs from temperature sensors that monitor the temperature at key contact locations; the closure sensors 94 which identify the state of each of the vacuum interrupters 14 for each phase of the circuit; and accelerometer and velocity sensors associated with the vacuum interrupters 14. Other sensor inputs can also be accepted to better understand the environment, current state of the components, service record and operating history of the system. Inputs are also supplied by manually operated relays and/or trip relays that perform, for example, instantaneous and delay trip calculations. The point-on-wave controller 88 performs, programmed synchronous closure of the contacts in the breaker module 14 by providing the appropriate output signals to the drivers 96, independently, to energize the in-line actuators 40 at the appropriate point in the current cycle for each phase of the line source, according to the given, programmed function that the point-on-wave controller is addressing. For example, if a manual closure command 90 is received the point-on-wave controller will monitor the current cycle in each phase and direct the in-line actuator to close the corresponding vacuum interrupter in the breaker module 14 at the most appropriate time to achieve an optimized scenario of circuit conditions, which is a function of the type of load, e.g., capacitive, inductive, etc. On the other hand, if the point-on-wave controller receives a trip signal, it will direct each of the respective in-line actuators 40 to open their corresponding vacuum interrupters in the breaker modules 14 immediately to avoid equipment damage and minimize arcing. For each type of load generally two such scenarios exist for closing and two for circuit opening—normal load and fault condition.

More particularly, the point-on-wave controller 88 in the module 84 is a microprocessor based electronic control which provides individual pole synchronous make and break circuit connections to increase electrical life of the vacuum interrupter contacts within the breaker module 14 and other system components, and dramatically reduces switching surges while providing a uniquely small sized product. The point-on-wave controller module 84 also provides timing adjustments for the permanent magnet in-line actuator circuits 40, to compensate for contact erosion, wear and environmental conditions. The system functions from either an electronic or manual command signal.

The electronics for driving the in-line actuators 40 include the following: a power conditioner and power supply 86, the point-on-wave controller 88, and the breaker module 14 in-line actuator drivers 96. As illustrated in FIG. 2, the point-on-wave controller 88 is connected between the power supply 86 and the breaker module in-line actuator drivers 96. The point-on-wave controller 88 functions as the command center. It receives data from sensors mounted on the breaker module 14, e.g., accelerometer, velocity sensor, etc., to determine the time required to close or open the contacts and the amount of contact erosion. It also monitors temperature, and can monitor other environmental conditions, e.g., humidity, to adjust for in-line actuator operational changes, and receives information from the control voltage, and the voltage and current transformers monitoring the line source.

The point-on-wave controller 88 also receives open and close commands from a circuit relay and provides the intelligence to do the point-on-wave operation.

The point-on-wave controller 88 will also interface with other electronic systems in the switchgear such as protective relays, remote commands, or communication functions. However, it is independent of these other electronic systems and must function even if such other systems are not completely operable.

The power supply 86 includes a power conditioner that accepts a range of in-put control power and converts the control power to a voltage, i.e., 48–250 VDC or AC, needed by the power supply 86. The voltage from the conditioner shown as part of the universal power supply 86 is used to charge the power supply, if necessary, i.e., charge a capacitor/battery. The power supply 86 acts as the energy storage means for the entire electronic system. The point-on-wave controller 88 receives this power from the power supply and provides all the timing and control necessary to operate the in-line actuators 40 and receives information about the operating characteristics of the breaker modules 14, via sensors, and adjusts itself to compensate "up front", based on present conditions and information about previous operations, which is stored in its memory. The breaker module in-line actuator driver 96 is the firing circuit that acts as a link between the power supply 86, point-on-wave controller 88, and in-line actuators 40, by receiving its power from the power supply and commands from the point-on-wave controller 88 to fire the in-line actuator coils 39 and 41.

The point-on-wave controller is intelligent enough to know the state of the contacts in the breaker modules 14, line source voltages and currents, control voltage, wear of the contacts, history of contact motion, charge condition of the control power supply, and temperature and other characteristics of the surrounding environment. The following chart explains illustrative inputs and outputs to the point-on-wave controller and the reason the individual characteristics are monitored.

TABLE 1

| Input (Which inputs?) | P.O.W, (Perform What?) | Output (Why Perform?) |
| --- | --- | --- |
| Medium Voltage Trip Unit Signal | (Receive signal to open or close from trip unit.) Commands start of process to generate open or close coil control signals synchronized with line for load type. | Synchronous operation of Phases A, B, C. |
| Current Phase A Phase B Phase C | Locale crossovers to use as reference to synchronize contact open. Phase A is the primary reference, Phase B is used a backup in case of missing A. | Synchronous operation of Phases A, B, C. |
| Voltage Phase A Phase B Phase C | Locale crossovers to use as reference to synchronize contact close. Phase A is the primary reference, Phase B is used a backup in case of missing Phase A. All Phases are used to verify phase sequence. Line frequency is calculated from crossover times. Rotate interruption among phases. (Phase to which last operation was referenced.) | Synchronous operation of Phases A, B, C. Adapt to Phase sequence. Use Phase B as reference if Phase A open. Determine line frequency. Extend life of VI's. |
| Temperature | Account for permanent magnet and coil operational characteristics due to changes in temperature. Voltage to coil is changed for temperature differences to maintain open and close times constant over temperature range. | Attempt to maintain constant open and close times for different temperatures and compensate for drift. |
| Accelerometer (Contact Touch/ Part) & Velocity Sensor (Armature Full Close/Open) | Calculate difference between current position and reference position to determine wear. Use to tell when to remove power from coil. Determine contact touch & part values. | Better predict future times for P.O.W. operation. Conserve energy by optimum removal of coil drive, predict end of contact life from wear. |
| Load Type | Use Look up table for each load type. (Most loads close at a voltage zero +/−1 msec and most loads open with a 4–6 mm contact gap at current zero.) | Minimize surge by applying best closing/opening points on the wave. |
| History | for life of breaker monitor; contact close/open time, temperature, load type, and contact wear. | Predict what is happening to contacts - are actual vs. predicted close/open times similar; send flag to maintenance person that VI contacts are becoming worn and need replacing or P.O.W. system failing. Provide long term correction to open/close time. |
| Charge Condition of Supply | Monitor state of supply; charge level and time to charge, possibly indicating supply is degrading. Number of Operations Counter (Determine when 10,000 operations has been met for VI bottle.) | Send flag to maintenance person that supply is degrading and needs service/replacement. If 10,000 operations is reached, send flag to maintenance person to check contacts.* |

*(The VI can likely perform 30,000 or more load current switching operations before it is worn out.)

The point-on-wave controller 88 is a microprocessor based controller that is programmable for various types of loads. There is an input to point-on-wave controller, not shown, that enables an operator to identify the appropriate type of load for which the corresponding point-on-wave control requirements are preprogrammed. The types of loads addressed include capacitor-ungrounded/grounded inductive, and resistive.

For closing the circuit for most loads, each pole is separately synchronized to close at the minimum of each phase voltage to minimize voltage disturbances. Upon closing the circuit on a short circuit current, each pole should be separately synchronized to close at the minimum of each phase voltage, which will produce the maximum current asymmetry under short circuit conditions. Since the short circuit condition cannot be known in advance in the load circuit, this is an unavoidable consequence. For opening a load current, all poles should be gang operated for simultaneous contact part with one phase synchronized to its face current is to part the contacts 1.5 to 2.5 milliseconds ahead of a current zero. Opening this far ahead of current zero with a minimum recommended opening speed will eliminate the occurrence of repetitive re-ignitions. This method results in an increased gap at the peak recovery voltage when opening on a capacitive load which minimizes the risk of restrikes.

Upon opening on a fault current, random opening with all poles ganged for simultaneous contact part will result in the contacts parting at random on the current waves in each phase. Since the current resulting from a short circuit introduces asymmetry in the currents, that are random in the phases, the times when the current zero occur, become difficult to predict. Therefore, attempts at synchronizing are too difficult and the random parting that occurs in present breakers is sufficient.

The strategy for synchronous operation employing the point-on-wave control of this invention follows:

On Closing Preferred Strategy a) Closing within one millisecond of a voltage zero will keep the energization voltage surge small. Closing 0.35 milliseconds early will result in a prestrike voltage of 0.37 per unit, while closing at 1.65 milliseconds late will result in a prestrike voltage of 0.37 per unit. The nominal closing time is therefore at 0.65 millisecond after voltage zero for a closing window of −1 millisecond to +1 millisecond on either side of nominal.

b) Closing near a voltage zero or at a voltage substantially less than peak is important: (i) for capacitor loads to prevent large inrush currents that produce extra current or voltage zeros; (ii) for inductive loads to prevent high energizing voltage surges; and for resistive loads it is less important, but preventing high energizing voltage surges has always been beneficial.

c) Closing near a voltage zero results in maximum asymmetry for short circuit currents. This result is unavoidable if the preferred closing strategy is used, since the presence of a short circuit is generally unknown before closing.

Alternate Strategy

Closing at or near a voltage peak can sometimes be important to minimize asymmetrical inrush currents: (i) for inductive loads to prevent high inrush currents—this is mainly an issue for shunt reactors; and (ii) although closing near a voltage peak can also minimize current asymmetry for short circuits, this benefit is only available if the alternate closing strategy is used.

Recommended Closing Speeds

The minimum closing speed recommended is based on limiting the voltage at pre-strike in capacitor switching applications, to less than or equal to 0.6 per unit which requires a closing speed of 1.1 meters per second at a 27 kilovolt rated voltage; or 1.5 meters per second minimum closing speed at a 38 kilovolt rated voltage.

On Opening (a) Opening before a current zero with a minimum initial opening speed to reach a minimum gap at the current zero is important: (i) for capacitor loads to minimize the risk of restrikes by obtaining enough gap to withstand the voltage when the peak recovery voltage is reached; (ii) for inductive loads to minimize the risk of repetitive re-ignitions that can occur when contacts part near a current zero; and (iii) for resistive loads it is less important, but a reasonably large gap at current zero is always preferable.

(b) Opening before a current zero to reach a minimum gap at the current zero sets a minimum time and the time between current zeros sets a maximum time. The time between zeros is 2.77 milliseconds at 60 hertz and 3.33 milliseconds at 50 hertz. So the maximum time to a current zero must be less than 2.77 milliseconds or a different current zero becomes critical. The contact parting time window on opening is smaller than on closing with a range of from 1.5 milliseconds to 2.5 milliseconds recommended, for a −0.5 milliseconds to +0.5 milliseconds range from nominal. A minimum time to current zero of 1.5 milliseconds provides a gap of 2.3 millimeters at 1.5 meters per second for a 27 kilovolt rated voltage; and 3.2 millimeters at 2.1 meters per second for a 38 kilovolt rated voltage. This is enough gap to minimize the risk of repetitive re-ignitions. A maximum time to current zero of 2.5 milliseconds provides a 0.27 millisecond cushion before the previous current zero in another phase is reached.

(c) Opening in synchronism to a current zero in each phase is not recommended. Simultaneous contact parts in all phases with synchronous contact part in only one phase is preferred. For capacitor switching, simultaneous contact parting yields a peak recovery voltage of 2.5 per unit in a three-phase ungrounded system. The first pole clears with the second and third poles about 90 electrical degrees later, or 4.1 milliseconds at 60 hertz. For capacitor switching, non-simultaneous contact parting can yield a peak recovery voltage of 3.0 per unit in a three-phase ungrounded system. The first pole clears with the second and third poles 180 electrical degrees or more later, or 8.3 milliseconds at 60 hertz. If each pole were synchronized to a current zero in its respective phase, then contact parts would be at zero, 2.77–3.3 milliseconds, and 5.54 to 6.66 milliseconds, which is enough to produce the three per unit recovery voltage.

(d) For short circuit currents, each phase has some asymmetry. The time between current zeros is not uniform or easily predictable. Therefore, attempts at synchronous operation can do more harm than good. Simultaneous contact part with no attempt at synchronization is therefore recommended for fault currents.

(e) The recommended opening speed based on obtaining an adequate open gap or capacitor switching at the peak recovery voltage is 1.5 to 2.0 meters per second, with a minimum opening gap of 15 millimeters, at a rated voltage of 27 kilovolts; and 2.1 to 2.5 meters per second, with a minimum opening gap of 21 millimeters, at a rated voltage of 38 kilovolts.

Figure 6A:
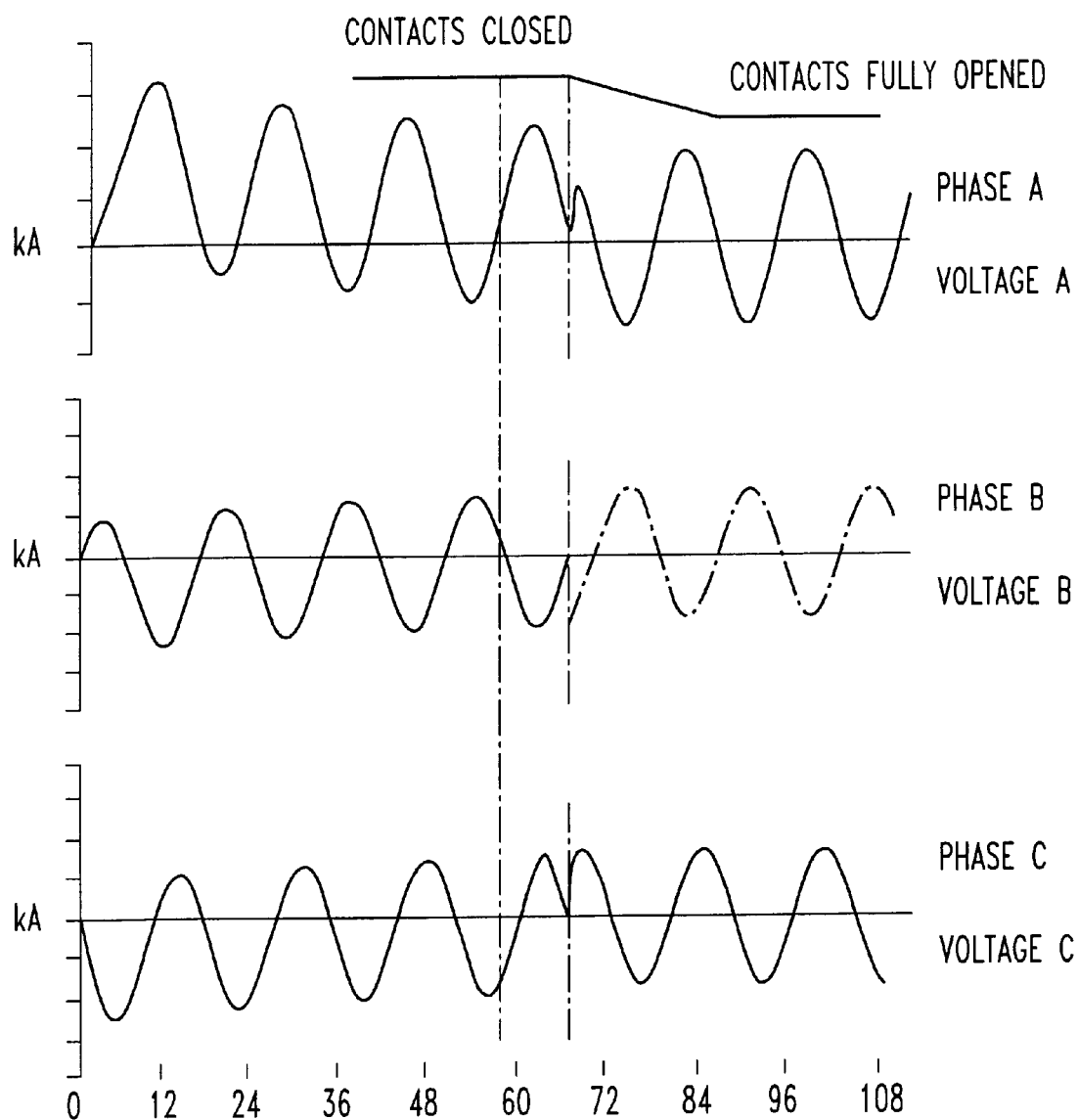
FIG. 6a is a graphical illustration showing the affect on a three-phase fault current wave form by a simultaneous opening of a three-pole prior art circuit interrupter.
Figure 6B:
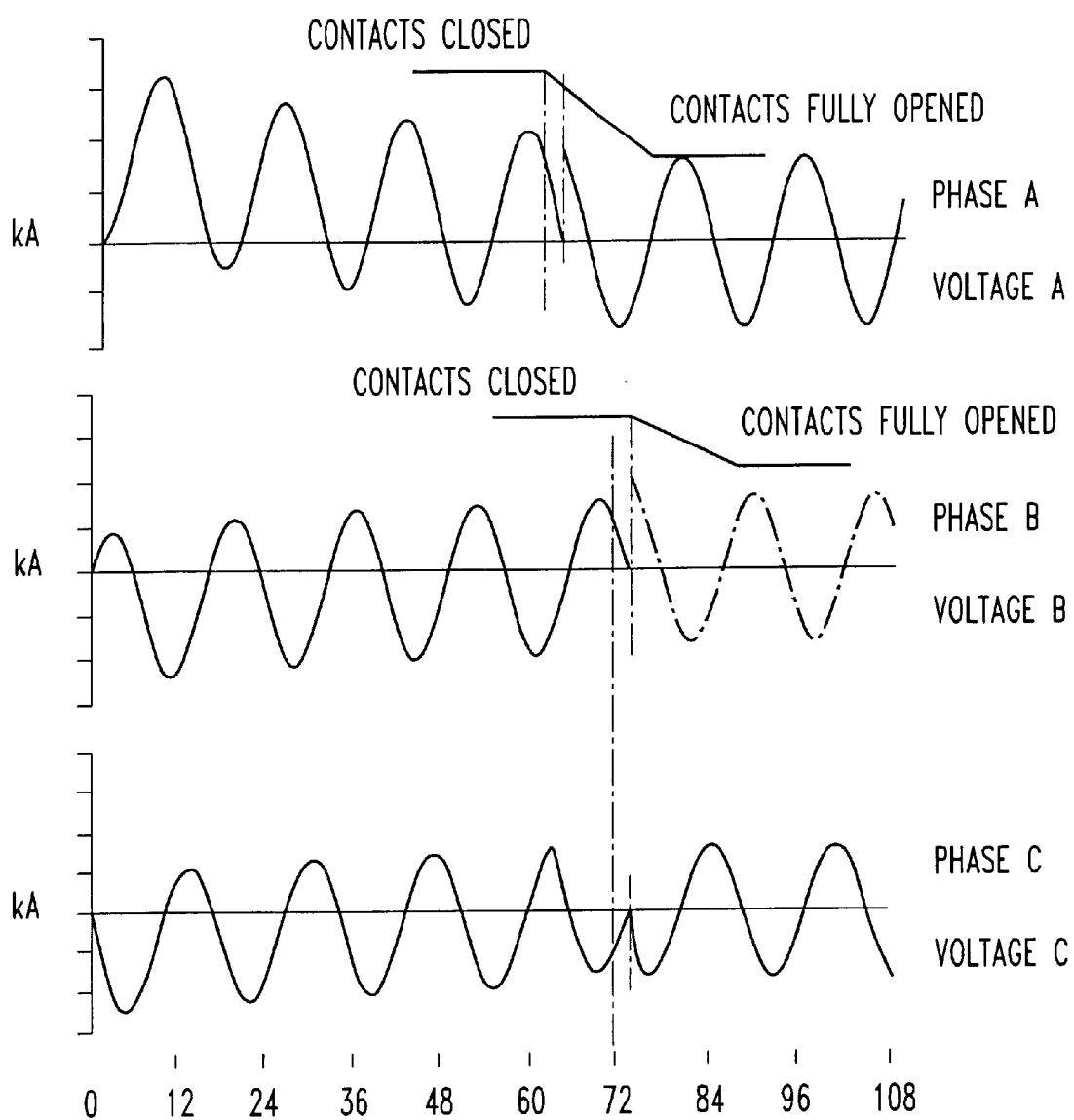
FIG. 6b is a graphical illustration showing the affect on a three-phase fault current wave form by a synchronous opening of three poles of a circuit breaker having independent actuators for each pole in accordance with this invention.

FIG. 6a illustrates the effect of the prior art response to a trip command in which each phase is disconnected simultaneously at a different point in the cycle. This occurred because a single actuator was commonly employed to implement the trip for all phases. The point-on-wave controller module 84 and individual in-line breaker modules 14 of this invention enable a synchronous opening of the respective phases, with individual control, that minimizes arcing, such as is illustrated in FIG. 6b.

FIG. 5a illustrates the modular components of this invention as previously shown in FIG. 1 applied to a single main bus bar three-phase assembly 98. The modular assembly of this invention is only shown connected to one phase, though it should be appreciated that separate breaker modules 14 and vacuum isolator modules 12 are provided for each phase.

As previously described, FIG. 5b illustrates an alternate arrangement in which each breaker module 14, corresponding to the individual phases of the load, is connected through a first vacuum isolator module 12 to a first bus bar phase 98 or through a second vacuum isolator module 12 connected through the first vacuum isolator module 12 to a corresponding phase of a second bus bar assembly 100, which can alternatively be employed to energize the load in the event of a problem experienced with the first bus bar assembly 98; through the appropriate interconnection of the moveable contacts in the first and second vacuum isolator modules 12. The interconnection between vacuum isolator modules 12 is made through a second connector 62 shown in FIG. 4, that is coupled to the same stationary contact 52 that the first bus bar assembly is connected to through connector 54.

Thus, this invention provides enhanced maintenance capabilities with the ability of replacing individual modules within a switchgear housing with a minimum of service outage time, while enabling a reduction in the size of the overall equipment through the judicious use of solid insulation and voltage isolation from lower voltage portions of the surrounding environment. The tried and tested combinations of solid epoxy resin plugs into molded silicon to EPDM rubber sockets have a good track record for cables and can be applied to seal all of the electrical connections noted for the switchgear package described above for this invention. The unique combination of the in-line magnetic actuator and vacuum interrupter within the breaker module 14 and the vacuum isolator module 12, will provide a unique capability for enabling point-on-wave switching that has long been an unobtainable, practical objective of the industry.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of invention which is to be given the full breadth of the appended claims and any and all equivalents thereof.

What is claimed is:

1. A circuit switching device comprising:
   a sealed container housing a medium having a lower electrical conductivity than air, wherein the container is impermeable to the medium;
   a first stationary contact sealed within the sealed container;
   a first electrical conductor connected to the first stationary contact at one end, sealably penetrating the sealed container and terminating at the other end in a first electrically insulated electrical connector;
   a moveable contact means sealed within the sealed container and moveable between a first position, out of electrical communication with the first stationary contact, and a second position, in electrical communication with the stationary contact;
   a second electrical conductor connected to the moveable contact means at one end, sealably penetrating the sealed container and terminating at the other end in a second electrically insulated electrical connector;
   solid insulation means formed on the sealed container for electrically insulating the sealed container and the electrical conductors and connectors external of the sealed container and substantially isolating the sealed container, conductors and connectors from contact with lower voltage potential portions of the surroundings when connected within a system the switching device is designed to interrupt; and
   an in-line actuator for moving the moveable contact means between the first and second positions in response to an actuation command indicative of a given circuit condition.

2. The switching device of claim 1 including a sensor for providing an output when the moveable contact means is in one of either the first or second positions.

3. The switching device of claim 1 including a sensor for providing an output indicative of the speed of movement of the moveable contact means.

4. The switching device of claim 1 including a sensor for providing an electrical output indicative of the length or time of travel of the moveable contact means.

5. The switching device of claim 1 wherein the terminations of the electrical connectors are designed to mate respectively with complementary connectors in a manner that substantially isolates the conductors and electrically conducting portions of the connectors from contact with lower voltage potential portions of the surroundings.

6. The switching device of claim 1 including:
   a second stationary contact sealed within the container and connected to ground;
   a third electrical conductor connected to the second stationary contact at one end, sealably penetrating the container and terminating at the other end in a third electrically insulated electrical connector; and
   wherein the moveable contact means is moveable between the first and second stationary contacts.

7. The switching device of claim 6 wherein the moveable contact means is moveable between the first, second and a third position in electrical communication with the second stationary contact and wherein the second position is out of electrical communication with the first and second stationary contacts.

8. The switching device of claim 5 wherein the connectors are formed from one of either of a plug or socket and the complementary connector is formed from the other of either the plug or socket.

9. The switching device of claim 6 wherein the connector terminations at the other end of the first and third conductors are of the same design.

10. The switching device of claim 6 wherein the first and second stationary contacts are electrically insulated from each other.

11. The switching device of claim 1 wherein the connector terminations at the other end of the first and second conductors are the same design.

12. The switching device of claim 1 wherein the solid insulation means is a housing that is formed on and encapsulates the container and exterior portions of the conductors and connectors, that except for a mating surface of each of said connectors and an interface with said in-line actuator, electrically insulates the container from lower voltage surroundings.

13. The switching device of claim 12 wherein the housing is constructed of epoxy.

14. The switching device of claim 1 wherein the medium is a vacuum.

15. The switching device of claim 1 wherein the in-line actuator comprises a first and second electromagnetic coil, the first electromagnetic coil for moving the moveable contact in a first direction and the second electromagnetic coil for moving the moveable contact in a second direction.

16. The switching device of claim 15 wherein the first and second coils are programmably energized at the same time to ease the moveable contact to a soft landing against the stationary contact, when closing.

17. The switching device of claim 1 wherein the polarity of voltage applied to a drive coil of the in-line actuator is reversed just prior to contact closure to ease the landing.

18. The switching device of claim 1 including a plurality of modular units that plug into complementary ones of the modular units wherein the container and in-line linear actuator form a first integral circuit breaker module.

19. The switching device of claim 18 wherein the first integral circuit breaker module and at least one other module that it interfaces with include an electrically conductive outer coating.

20. The switching device of claim 18 wherein the solid insulation means forms an electrically insulating barrier substantially around the first circuit breaker module except for the connector electrically conducting interfaces with the complementary connectors effectively isolating electrically conductive portions of the switching device from electrical communication with lower voltage potential portions of the surroundings.

21. The switching device of claim 18 wherein a separate corresponding first module independently controls the physical connection or separation of electrical conduction in each phase of a multi-phase circuit.

22. The switching device of claim 21 including a second integral circuit connector module comprising:
- a plurality of first electrically insulated electrical output connectors at least corresponding to the number of phases in a line source to which the switching device is to be applied, with each first output connector designed to mate with a corresponding complementary electrical utilization circuit connector attached to the corresponding phase of a load circuit in a manner that electrically insulates electrically conducting portions of the utilization circuit connector and the output connector from the surrounding environment; while providing electrical connection therebetween, and substantially isolates those portions from contact with the surrounding environment;
- a plurality of current sensors respectively connected to monitor the current flowing through corresponding first output connectors and provide an output indicative thereof;
- a plurality of output conductors respectively connected at one end to the corresponding ones of the first output connectors and at the other end to corresponding second output connectors which respectively have a complementary end termination designed to mate with either the first or second insulated connector on the first module in a manner that electrically insulates the electrically conducting portions of the mating connectors from external current flow while maintaining good electrical conduction between mating connectors and substantially isolating those conducting portions from contact with lower voltage portions of the surrounding environment; and
- a second insulated housing substantially enclosing and respectively insulating the first and second output connectors, the output conductors, and current transformers in a manner that insulates each phase from each other, substantially isolates all the current carrying portions thereof from contact with lower voltage portions of the surrounding environment, and ties the first and second output connectors, output conductors and current transformers together as an integral unit.

23. The switching device of claim 22 including a plurality of insulated voltage conductors respectively connected between different phases of the output conductors or between a selected phase of the output conductors and a neutral conductor, within the second insulated housing of the second module, at one end, and to a voltage connector at the other end of the voltage conductors, wherein the voltage connector is designed to mate with a compatible connector on a voltage transformer.

24. The switching device of claim 22 including a third integral switch module comprising:
- a sealed switch container housing a medium having a lower electrical conductivity than air, wherein the switch container is impermeable to the medium;
- a first stationary switch contact sealed within the switch container;
- a first electrical switch conductor connected to the first stationary switch contact at one end, sealably penetrating the switch container and terminating at the other end in a first electrical switch connector;
- a second stationary switch contact sealed within the switch container;
- a second electrical switch conductor connected to the second stationary switch contact at one end and sealably penetrating the switch container and terminating at the other end in a second electrical switch connector;
- moveable switch contact means sealed within the switch container and moveable between a first position, in electrical communication with the first stationary switch contact, and a second position, in electrical communication with the second stationary switch contact; and
- a third electrical switch conductor connected to the moveable contact at one end, sealably penetrating the switch container and terminating at the other end in a third electrical switch connector; and
- means for moving the moveable switch contact means between the first and second positions in response to a given operator action.

25. The switching device of claim 24 wherein the second switch connector is connected to ground.

26. The switching device of claim 24 wherein the means for moving the moveable switch contact means moves the moveable switch contact means into electrical engagement with either the first stationary switch contact, the second stationary switch contact, or a third position out of electrical engagement with either the first or second stationary switch contact, upon a given operator command.

27. The switching device of claim 24 wherein the first electrical switch conductor terminates at the other end in the first electrical switch connector and a fourth electrical switch connector.

28. The switching device of claim 27 including a means for insulating the first or fourth switch connector when not connected to the circuit.

29. The switching device of claim 28 wherein the means for insulating the first or forth electrical switch connector when not connected to the circuit comprises a complementary connector substantially constructed from electrical insulation.

30. The switching device of claim 24 including solid insulation means for electrically insulating the switch container and the corresponding first and third electrical conductors and connectors external of the switch container and substantially isolating the switch container, corresponding first and third conductors and connectors from contact with lower voltage portions of the circuit when the switching device is connected within a system it is designed to interrupt.

31. The switching device of claim 21 wherein the opening and closing of the respective phases of the multiphase circuit, physically actuated by the corresponding first circuit breaker module, is controlled by a master controller module which sends independent distinct control signals to the respective first circuit breaker modules.

32. The switching device of claim 31 wherein the master controller module monitors the current in each phase of the circuit and upon command actuates the respective first modules to open or close the circuit when the corresponding current is at a preprogrammed point in the current wave form cycle.

33. The switching device of claim 31 wherein the master controller module upon an indication of a current fault condition actuates the corresponding first circuit breaker module for each phase, simultaneously, to open the circuit.

34. The switching device of claim 32 wherein the master controller module monitors electrical characteristics of the current and mechanical characteristics of the switching device modules and uses those parameters to calculate the timing of the actuation signals to close or open the breaker modules at the preprogrammed point in the current wave form cycle.

35. The switching device of claim 34 wherein the master controller module also monitors a parameter characteristic of the environment surrounding a switching device module and uses the environmental parameter in calculating the time of the actuation signals.

36. The switching device of claim 35 wherein the environmental parameter is temperature.

37. The switching device of claim 32 wherein the preprogrammed point in the current wave form cycle is a selected range on either side of a current zero.

38. The switching device of claim 32 wherein the preprogrammed point in the current wave form cycle is a selected range on either side of the current value corresponding to a voltage peak.

39. A circuit switching device comprising:
- a sealed container housing a medium having a lower electrical conductivity than air, wherein the container is impermeable to the medium;
- a first stationary contact sealed within the sealed container;
- a first electrical conductor connected to the first stationary contact at one end, sealably penetrating the sealed container and terminating at the other end in a first electrically insulated electrical connector;
- a moveable contact means sealed within the sealed container and moveable between a first position, out of electrical communication with the first stationary contact, and a second position in electrical communication with the stationary contact;
- a second electrical conductor connected to the moveable contact means at one end, sealably penetrating the sealed container and terminating at the other end in a second electrically insulated electrical connector;
- a second stationary contact sealed within the container and connected to ground;
- a third electrical conductor connected to the second stationary contact at one end, sealably penetrating the container and terminating at the other end in a third electrically insulated electrical connector;
- means for moving the moveable contact means between the first and second stationary contacts; and
- wherein the sealed container is divided into two tandem compartments, each compartment housing one of said first and second stationary contacts at adjacent ends of the compartments and wherein the moveable contact means comprises a first moveable contact housed in a first of the two compartments with the first stationary contact and a second moveable contact housed in a second of the two compartments with the second stationary contact, wherein the first and second moveable contacts are connected in parallel to the second electrical conductor and are moved by the moving means.

40. The switching device of claim 39 wherein the first and second moveable contacts are interlocked in a manner that only one or the other of the first and second moveable contacts can be respectively connected to their corresponding first and second stationary contacts at any point in time.

41. The switching device of claim 40 wherein the compartments are formed from two back-to-back vacuum interrupters.

* * * * *